(12) United States Patent
Silveira

(10) Patent No.: US 6,348,222 B1
(45) Date of Patent: *Feb. 19, 2002

(54) MILK REPLACER WITHOUT ANIMAL FAT, FOR FEEDING VEAL CALVES

(75) Inventor: Manuel Silveira, Cambridge (CA)

(73) Assignee: Grober Inc., Cambridge (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,962

(22) Filed: Aug. 18, 1998

(51) Int. Cl.$^7$ .................................................. A23K 1/18
(52) U.S. Cl. ............................ 426/2; 426/588; 426/607; 426/807
(58) Field of Search ........................... 426/2, 607, 601, 426/807, 588

(56) References Cited

U.S. PATENT DOCUMENTS

| | | | |
|---|---|---|---|
| 3,011,892 A | * 12/1961 | Rosenberg | ................... 426/607 |
| 4,285,972 A | * 8/1981 | Chou | ......................... 424/326 |
| 4,447,254 A | 5/1984 | Hughes et al. | |
| 4,673,576 A | 6/1987 | D'Aiello | |
| 4,818,531 A | 4/1989 | Anderson et al. | |
| 5,028,440 A | 7/1991 | Nissen | |
| 5,128,167 A | * 7/1992 | De Laporte | ................. 426/520 |
| 5,137,735 A | 8/1992 | Bignon | |
| 5,686,490 A | * 11/1997 | Okazaki | ...................... 426/601 |
| 5,795,602 A | * 8/1998 | Craig | ............................ 426/2 |

FOREIGN PATENT DOCUMENTS

| | | | |
|---|---|---|---|
| DE | 66774 A | * | 9/1997 |
| GB | 1045704 | * | 12/1963 |
| SU | 1500236 | * | 8/1989 |

OTHER PUBLICATIONS

"La Revue de L'alimentation animale" Mar. 1998.

* cited by examiner

Primary Examiner—Carolyn Paden
(74) Attorney, Agent, or Firm—R. Craig Armstrong

(57) ABSTRACT

The milk replacer for special fed veal does not contain animal fats, and shows comparable or improved growth rate of calves and quality of veal with respect to color, tenderness and nutritional content, compared to special fed veal fed with conventional milk replacers using animal fat. The fat portion of the milk replacer is replaced by a fat mix which in the preferred embodiment has approximately 80% partially hydrogenated soybean oil, 15% coconut oil, 4% lecithin, and 1% emulsifiers. Variations on actual ingredients and percentages are within the scope of the invention, the essence being the avoidance of animal fats.

21 Claims, No Drawings

MILK REPLACER WITHOUT ANIMAL FAT, FOR FEEDING VEAL CALVES

BACKGROUND OF THE INVENTION

1. Field of the Invention

This invention relates to the composition of milk replacers for feeding special fed veal calves, and to a method of raising special fed veal calves using the composition.

2. Description of the Prior Art

In order to produce a lighter colored, more tender, lower in fat and cholesterol content meat, special fed veal calves are fed a diet consisting only of milk, or preferably suitable compositions commonly referred to as milk replacers. A wide range of ingredients are used in various combinations in milk replacers. Such ingredients include skim milk, whey protein concentrate, whey, whey by-products, vegetable proteins (soy protein concentrate, soy protein isolate, hydrolysed wheat gluten, potato protein), animal fats (lard, tallow, fish oil), vegetable oils (coconut oil, palm oil), lecithin, emulsifiers and a combination of minerals and vitamins such as calcium, phosphorus, iron, copper, Vitamin A, Vitamin D and Vitamin E for example. Various combinations and proportions of ingredients are used in an attempt to maximize growth efficiency and meat quality.

Typically 15 to 22% by weight of the milk replacer is protein. In order to maximize growth and muscle development, amino acids from protein are utilized to synthesize body proteins, rather than utilized as an energy source. When feed contains insufficient protein, calves generally do not gain sufficient weight. When the proportion of the protein in the feed is excessive, the animals may experience digestive upset, which also has a detrimental effect on their rate of weight gain. Generally, protein is obtained from one of several sources, such as casein protein, whey protein, soya protein, potato protein, wheat gluten protein, and synthetic amino acids.

The fat portion of milk replacers typically ranges from 15% to 20% by weight. In a typical milk replacer, the fat portion is a mix of both vegetable oils and animal fats. For example, one fat mix has about 40% tallow by weight, 40% lard, 15% coconut oil, 4% lecithin and 1% emulsifiers. The combination of fats and oils is designed to maximize milk replacer digestibility and thus ultimately the growth of the calves.

Carbohydrates are provided from conventional sources such as lactose, starch and dextrose, and provide the greatest portion of energy in the milk feed, ranging from 45 to 57% by weight.

A mixture of vitamins and minerals is typically added to the milk replacer to ensure that the calves are provided with adequate nutrients for optimum growth.

One problem with the use of animal fats is that it impacts on the marketability of the calves as kosher meat. Feeding special fed veal a milk replacer with an absence of animal fat provides an opportunity to market the calves as kosher meat. Because kosher calves must be raised and slaughtered in accordance with strict rules, one of which is not allowing contamination of the meat with dairy products, use of animal fat mixtures of non-designated ingredients may jeopardize the kosher designation of meat, thus precluding its marketability to the kosher consumer.

There thus exists a need for a milk replacer for feeding special fed veal calves which does not contain animal fats. Such a milk replacer should provide comparable or improved animal growth rate, and comparable or improved quality of the veal in terms of color, tenderness and nutritional content.

SUMMARY OF THE INVENTION

In view of the above, it is an object of the invention to provide an effective milk replacer for special fed veal which does not contain animal fats and which when fed to special fed veal calves shows comparable or improved growth rate of calves and comparable or improved quality of veal with respect to color, tenderness and nutritional content, compared to veal fed with conventional milk replacers using animal fats.

In the preferred embodiment of the invention, the fat portion of the milk replacer is replaced by a fat mix which contains no animal fat. Preferably but not necessarily, the fat mix has approximately 80% partially hydrogenated soybean oil, 15% coconut oil, 4% lecithin, and 1% emulsifiers. In the invention more broadly defined, the actual composition of the fat mix may vary considerably, as discussed in the detailed description below.

As also discussed in the detailed description below, the fat mix may be included in various proportions in the milk replacers. The specific sources of protein, carbohydrates and other constituents of the milk replacer may also vary.

Experiments to date have shown that the milk replacer of the invention produces the desired comparable or improved growth rate of calves and comparable or improved quality of veal with respect to color, tenderness and nutritional content. It is also a possibility, though not yet proven, that the veal may have a lower level of cholesterol than veal fed a milk replacer containing animal fats.

Further features of the invention will be described or will become apparent in the course of the following detailed description.

DETAILED DESCRIPTION OF THE PREFERRED EMBODIMENT

A study was conducted in order to compare the growth rate, size and quality of meat of calves raised using a milk replacer with no animal fats to the growth rate, size and quality of meat of calves raised using a milk replacer with a conventional animal fat mix.

An experimental group of 120 calves was raised by feeding them one milk replacer ration ("the starter ration") for 6 weeks and then a second milk replacer ration ("the finisher ration") until slaughter at 18 weeks. In the experimental group, the fat content of both the starter and finisher rations came from a fat mix ("the preferred fat mix"), having 80% partially hydrogenated soybean oil, 15% coconut oil, 4% lecithin and 1% emulsifiers.

The fat mix accounted for about 14.4% of the starter ration, and 17.3% of the finisher ration. Clearly, these percentages could be varied as desired, in the same manner that the percentage of prior art fat portions are varied. For example, the fat mix could constitute as little as 13% of the overall ration, or as much as 20%, with possibly acceptable results. Even higher or lower percentages could be possible, although some performance degradation would be expected.

The growth rate, size and quality of meat of the experimental group of calves were compared to a previously raised control group of calves. Calves raised in the experimental group were found to not differ significantly from those of the control group with respect to growth rates, size at slaughter, and color and tenderness of the meat. Although not yet verified by the experimental results, the calves raised in the experimental group were expected to have lower levels of cholesterol in their meat than in the control group, given that the vegetable oils in the milk replacer fed to the experimental group did not contain cholesterol.

The method of feeding and the contents of the starter and finisher rations used in the experimental group and in the control group were identical, except that the fat content in the milk replacers fed to the experimental group came from the preferred fat mix, while the fat content in the milk replacers fed to the previously raised control group came from a typical fat mix having lard, tallow, coconut oil, lecithin and emulsifiers.

Tables 1 and 2 below show the approximate ingredient percentages for the starter and finisher rations respectively:

TABLE 1

Starter Ration

| Ingredient | Approximate % by weight |
|---|---|
| skim milk powder | 20% |
| whey protein concentrate | 22% |
| whey powder | 41.9% |
| fat mix | 14.4% |
| mineral premix | 1% |
| vitamin premix | 0.7% |

TABLE 2

Finisher Ration

| Ingredient | Approximate % by weight |
|---|---|
| whey protein concentrate | 33.8% |
| whey powder | 46.8% |
| fat mix | 17.3% |
| mineral premix | 1.6% |
| vitamin premix | 0.7% |

The ingredients and percentages of the non-fat portions of the rations may vary widely, in the same manner as they vary in the prior art. A wide range of ingredients could be included as alternative sources of protein and carbohydrates and the exact contents of the mineral premix and the vitamin premix may also vary. The percentage by weight of protein, fat, carbohydrates and other ingredients may also vary, as evidenced by actual variations seen in different milk replacers currently on the market and in use in feeding systems.

It is anticipated that regardless of the other specific ingredients of the milk replacer (i.e. protein, carbohydrates, vitamin, minerals), calves fed a given milk replacer using the preferred fat mix with no animal fat would show comparable results, and may in fact show improved results, over the calves fed the same milk replacer but using the fat mix containing animal fat.

Table 3 shows the preferred fat mix, and possible ranges for the ingredients of the preferred fat mix:

TABLE 3

Preferred Fat Mix

| Ingredient | Approximate % by weight | Preferred Ranges | Possible Ranges |
|---|---|---|---|
| Coconut oil | 15% | 15%–25% | 10%–30% |
| Soybean oil (partially hydrogenated) | 80% | 70%–80% | 65%–89% |
| Lecithin | 4% | 4%–7% | 1%–9% |
| Emulsifiers | 1% | 1%–2% | 0%–2% |

The percentages of the preferred ingredients could be varied as shown in Table 3 above. The preferred embodiment as used in the experiments is shown in the second column. The third column indicates a range where the expected results would presumably be very good. The fourth column indicates a range where the results might be good, but might not be optimum or desirable. The percentages can be varied according to preference, as in the prior art, using routine experimental verification to determine the optimum for any given situation.

It must also be clearly understood that the preferred fat mix ingredients themselves may be readily varied, not just their percentages. The essence of the invention is not necessarily limited to the specific preferred ingredients, the broad concept being the avoidance of animal fats. Thus for example a variable amount of palm oil or palm kernel oil could be used to reduce the amount of soybean oil used. Also, rape seed or peanut oil could also be used, although it is expected that the results would not be as good as if using the preferred ingredients.

Also, the level of hydrogenation of soybean oil, measured by its melting point, affects the fatty acid profile of the oil and thus the digestibility of the fat mix. Therefore, the hydrogenation level of the soybean oil is manipulated to vary its melting point in order to maximize the digestibility of the milk replacer. To maximize digestibility, the melting point of partially hydrogenated soybean oil should be above 30 degrees Celsius and below 40 degrees, preferably being between 33 degrees and 38 degrees.

What is claimed as the invention is:

1. A milk replacer, specifically formulated for use as a milk replacer to feed veal calves without the use of fresh whole milk, to produce special-fed veal, said milk replacer having a protein portion and a fat portion, said fat portion containing no animal fat and constituting 13–20% of said milk replacer on a dry matter basis, wherein said fat portion comprises partially hydrogenated soybean oil, coconut oil, lecithin, and emulsifier.

2. A milk replacer as recited in claim 1, wherein said fat portion has the following ingredients in approximately the following percentage ranges, by weight:

partially hydrogenated soybean oil 65 to 95 percent coconut oil 10 to 30 percent lecithin 1 to 9 percent emulsifier 0 to 2 percent.

3. A milk replacer as recited in claim 1, wherein said fat portion has the following ingredients in approximately the following percentage ranges, by weight:

partially hydrogenated soybean oil 70 to 80 percent coconut oil 15 to 25 percent lecithin 4 to 7 percent emulsifier 1 to 2 percent.

4. A milk replacer as recited in claim 1, wherein said fat portion has the following ingredients in approximately the following percentages, by weight:

partially hydrogenated soybean oil 80 percent coconut oil 15 percent lecithin 4 percent emulsifier 1 percent.

5. A milk replacer, specifically formulated for use as a milk replacer to feed veal calves without the use of fresh whole milk, to produce special-fed veal, said milk replacer having a protein portion and a fat portion, said fat portion containing no animal fat, said milk replacer having the following components in approximately the following percentages, on a dry matter basis:

protein 16–22% fat portion 13–20% carbohydrates 49–57% minerals 1–2% vitamins 0–%.

6. A milk replacer as recited in claim 5, comprising the following ingredients in approximately the following percentages, on a dry matter basis:

skim milk powder 20% whey protein concentrate 22% whey powder 41.9% fat portion 14.4% minerals 1% vitamins 0.7%.

7. A milk replacer as recited in claim 5, comprising the following ingredients in approximately the following percentages, on a dry matter basis:

whey protein concentrate 33.8% whey powder 46.8% fat portion 17.3% minerals 1.6% vitamins 0.7%.

8. A method of raising veal calves to produce special-fed veal, comprising the step of feeding the calves a milk replacer and no fresh whole milk, said milk replacer having a protein portion and a fat portion, said fat portion containing no animal fat and constituting 13–20% of said milk replacer on a dry matter basis, wherein said fat portion comprises the following ingredients in approximately the following percentage ranges, by weight:

partially hydrogenated soybean oil 65 to 95 percent coconut oil 10 to 30 percent lecithin 1 to 9 percent emulsifier 0 to 2 percent.

9. A method as recited in claim 8, wherein said fat portion has the following ingredients in approximately the following percentage ranges, by weight:

partially hydrogenated soybean oil 70 to 80 percent coconut oil 15 to 25 percent lecithin 4 to 7 percent emulsifier 1 to 2 percent.

10. A method as recited in claim 8, wherein said fat portion has the following ingredients in approximately the following percentages, by weight:

partially hydrogenated soybean oil 80 percent coconut oil 15 percent lecithin 4 percent emulsifier 1 percent.

11. A method of raising veal calves to produce special-fed veal, comprising the step of feeding the calves a milk replacer and no fresh whole milk, said milk replacer having a protein portion and a fat portion, said fat portion containing no animal fat, wherein said milk replacer has the following components in approximately the following percentages, on a dry matter basis:

protein 16–22% fat portion 13–20% carbohydrates 49–57% minerals 1–2% vitamins 0–1%.

12. A method of raising veal calves to produce special-fed veal, comprising the step of feeding the calves a milk replacer and no fresh whole milk, said milk replacer having a protein portion and a fat portion, said fat portion containing no animal fat, comprising the steps of feeding the calves a first ration of said milk replacer for a first period of time, and a second ration of said milk replacer ration for a second period of time, wherein said fat portion constitutes a substantially higher percentage in the second ration than in the first ration.

13. A method of raising veal calves as recited in claim 12, wherein said first ration comprises the following ingredients in approximately the following percentages, on a dry matter basis:

skim milk powder 20% whey protein concentrate 22% whey powder 41.9% fat portion 14.4% minerals 1% vitamins 0.7% and wherein said second ration comprises the following ingredients in approximately the following percentages, on a dry matter basis:

whey protein concentrate 33.8% whey powder 46.8% fat portion 17.3% minerals 1.6% vitamins 0.7%.

14. A method of raising veal calves according to claim 12, wherein said first period of time is approximately six weeks, and said second period of time is approximately twelve weeks.

15. A method of raising veal calves according to claim 13, wherein said first period of time is approximately six weeks, and said second period of time is approximately twelve weeks.

16. A milk replacer, specifically formulated for use as a milk replacer to feed veal calves to produce special-fed veal, having the following components in approximately the following percentages, on a dry matter basis:

protein 16–22% fat portion 13–20% carbohydrates 49–57% minerals 1–2% vitamins 0–1% wherein said fat portion has the following ingredients in approximately the following percentage ranges, by weight:

partially hydrogenated soybean oil 65 to 89 percent coconut oil 10 to 30 percent lecithin 1 to 9 percent emulsifier 0 to 2 percent.

17. A milk replacer as recited in claim 16, comprising the following ingredients in approximately the following percentages, on a dry matter basis:

skim milk powder 20% whey protein concentrate 22% whey powder 41.9% fat portion 14.4% minerals 1% vitamins 0.7%.

18. A milk replacer as recited in claim 16, comprising the following ingredients in approximately the following percentages, on a dry matter basis:

whey protein concentrate 33.8% whey powder 46.8% fat portion 17.3% minerals 1.6% vitamins 0.7%.

19. A method of raising veal calves to produce special-fed veal, comprising the step of feeding the calves a milk replacer having the following components in approximately the following percentages, on a dry matter basis:

protein 16–22% fat 13–20% carbohydrates 49–57% minerals 1–2% vitamins 0–1% wherein said fat portion has the following ingredients in approximately the following percentage ranges, by weight:

partially hydrogenated soybean oil 65 to 89 percent coconut oil 10 to 30 percent lecithin 1 to 9 percent emulsifier 0 to 2 percent.

20. A method as recited in claim 19, wherein said milk replacer comprises the following ingredients in approximately the following percentages, on a dry matter basis:

skim milk powder 20% whey protein concentrate 22% whey powder 41.9% fat portion 14.4% minerals 1% vitamins 0.7%.

21. A method as recited in claim 19, wherein said milk replacer comprises the following ingredient in approximately the following percentages, on a dry matter basis:

whey protein concentrate 33.8% whey powder 46.8% fat portion 17.3% minerals 1.6% vitamins 0.7%.

\* \* \* \* \*